(12) United States Patent
Kato et al.

(10) Patent No.: US 11,280,225 B2
(45) Date of Patent: Mar. 22, 2022

(54) WASTE HEAT UTILIZATION DEVICE

(71) Applicant: ISUZU MOTORS LIMITED, Tokyo (JP)

(72) Inventors: Kota Kato, Fujisawa (JP); Susumu Fukunaga, Fujisawa (JP); Makoto Abe, Fujisawa (JP); Tomofuyu Matsuuki, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 0 days.

(21) Appl. No.: 16/971,126

(22) PCT Filed: Feb. 18, 2019

(86) PCT No.: PCT/JP2019/005760
§ 371 (c)(1),
(2) Date: Aug. 19, 2020

(87) PCT Pub. No.: WO2019/163691
PCT Pub. Date: Aug. 29, 2019

(65) Prior Publication Data
US 2021/0108540 A1 Apr. 15, 2021

(30) Foreign Application Priority Data
Feb. 20, 2018 (JP) .............................. JP2018-028315

(51) Int. Cl.
*F01K 23/06* (2006.01)
*F01K 9/00* (2006.01)
(Continued)

(52) U.S. Cl.
CPC ............ *F01K 23/065* (2013.01); *F01K 9/003* (2013.01); *F01K 13/02* (2013.01); *F01K 23/10* (2013.01); *F01K 23/14* (2013.01)

(58) Field of Classification Search
CPC ........ F01K 23/065; F01K 13/02; F01K 23/10; F01K 9/003; F01K 23/14
(Continued)

(56) References Cited

U.S. PATENT DOCUMENTS 6,651,433 B1 * 11/2003 George, Jr. ............... F02C 3/00
60/618
2005/0188711 A1 9/2005 Wang et al.
(Continued)

FOREIGN PATENT DOCUMENTS

JP 2000345915 A 12/2000
JP 2005-240740 A 9/2005
(Continued)

OTHER PUBLICATIONS

Notice of Reasons for Refusal for related JP App No. 2018-028315 dated Jul. 6, 2021, 10 pgs.
(Continued)

*Primary Examiner* — Hoang M Nguyen
(74) *Attorney, Agent, or Firm* — Procopio, Cory, Hargreaves & Savitch LLP

(57) ABSTRACT

A waste heat utilization device for a vehicle, said waste heat utilization device being provided with a Rankine cycle system and comprising: a motor-generator that is connected to an expander and is structured so as to be able to rotate integrally with the expander; a clutch device that is provided between the expander and a power transmission system of the vehicle; and a clutch control unit that is structured so as to control switching of the clutch device between a connected state and a disconnected state.

3 Claims, 2 Drawing Sheets

(51) Int. Cl.
    *F01K 13/02*     (2006.01)
    *F01K 23/10*     (2006.01)
    *F01K 23/14*     (2006.01)

(58) Field of Classification Search
    USPC .......................................... 60/614, 616, 618
    See application file for complete search history.

(56) References Cited

U.S. PATENT DOCUMENTS

| | | | |
|---|---|---|---|
| 2012/0019010 A1* | 1/2012 | Nakamura | F01C 13/04 290/1 R |
| 2013/0056992 A1 | 3/2013 | Wada et al. | |
| 2013/0084164 A1 | 4/2013 | Adachi et al. | |
| 2014/0075941 A1 | 3/2014 | Adachi et al. | |
| 2014/0134034 A1* | 5/2014 | Nakamura | F01C 21/008 418/55.3 |
| 2015/0184551 A1 | 7/2015 | Son et al. | |
| 2016/0076403 A1* | 3/2016 | Haraguchi | F01K 23/14 60/618 |
| 2017/0260889 A1 | 9/2017 | Zhou et al. | |
| 2018/0156143 A1* | 6/2018 | Hussain | F02D 41/0077 |

FOREIGN PATENT DOCUMENTS

| | | |
|---|---|---|
| JP | 2010065587 A | 3/2010 |
| JP | 2010185417 A | 8/2010 |
| JP | 2010190185 A | 9/2010 |
| JP | 2011202518 A | 10/2011 |
| JP | 2012153192 A | 8/2012 |
| JP | 2013092144 A | 5/2013 |
| JP | 2013181394 A | 9/2013 |
| JP | 2014058877 A | 4/2014 |
| JP | 2015108304 A | 6/2015 |
| JP | 2015127526 A | 7/2015 |
| JP | 2017066922 A | 4/2017 |
| JP | 2017145799 A | 8/2017 |
| JP | 2018017149 A | 2/2018 |

OTHER PUBLICATIONS

International Search Report and Written Opinion for related JP App No. PCT/JP2019/005760 dated May 7, 2019. English translation provided; 11 pages.

Japanese Patent Office, Notice of Reasons for Refusal, Application No. JP2018-028315, dated Dec. 1, 2021, in 10 pages.

* cited by examiner

[Fig. 1]
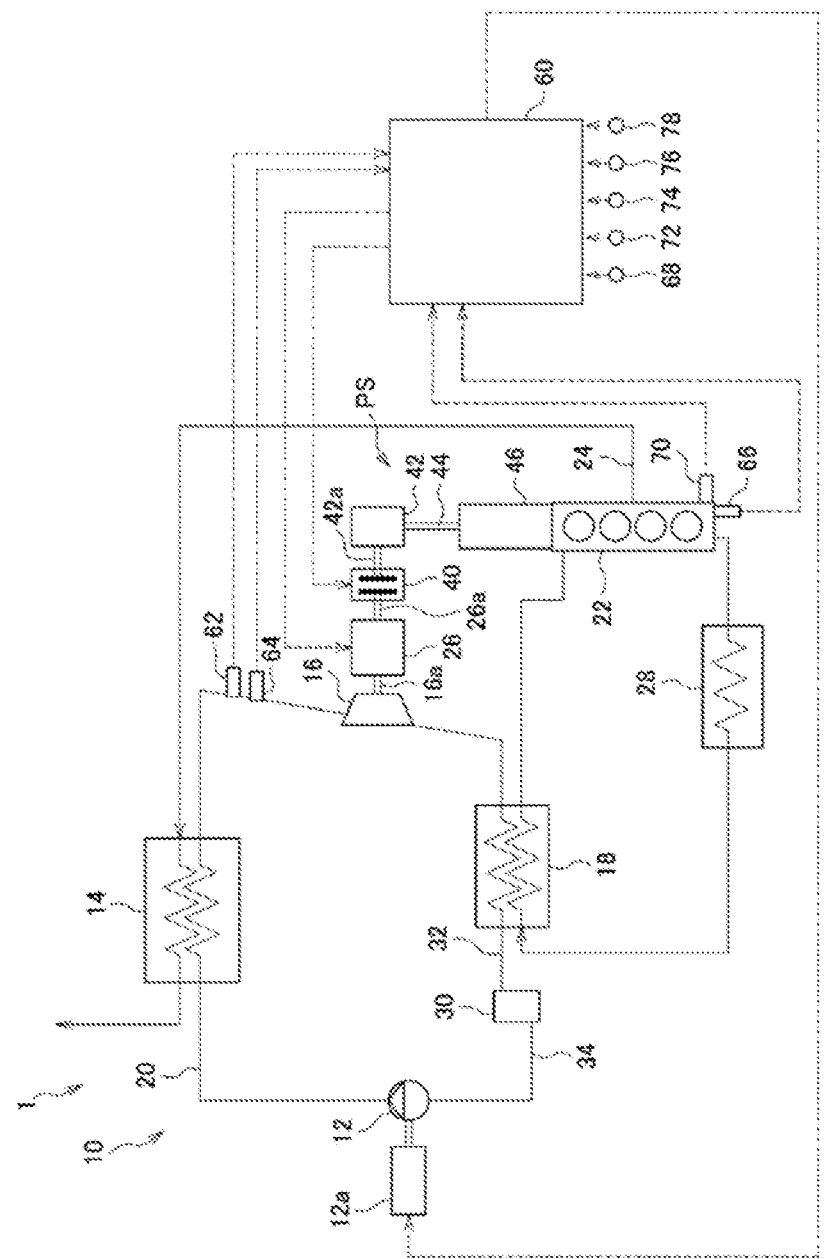

[Fig. 2]
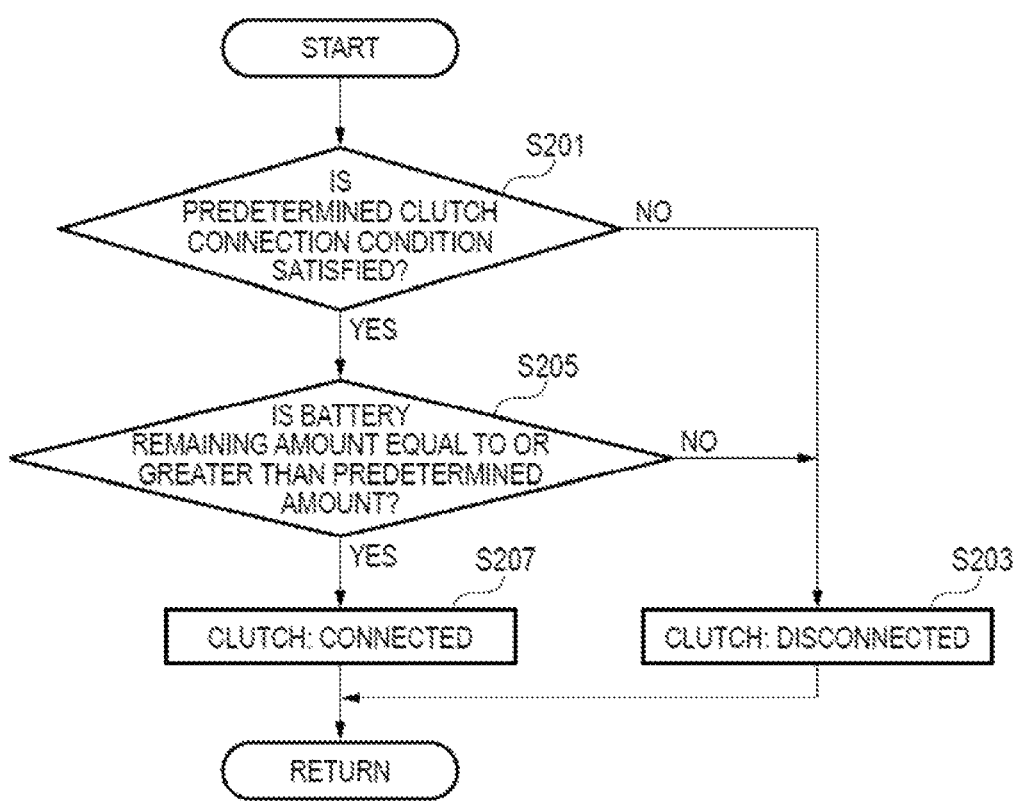

WASTE HEAT UTILIZATION DEVICE

CROSS-REFERENCE TO RELATED APPLICATIONS

This application is a U.S. National Stage entry of PCT Application No. PCT/JP2019/005760, filed on Feb. 18, 2019, which claims priority to JP Application No. 2018-028315, filed Feb. 20, 2018. The contents of the foregoing are incorporated by reference.

TECHNICAL FIELD

The present disclosure relates to a waste heat utilization device in a vehicle, and particularly to a waste heat utilization device including a Rankine cycle system that generates power by use of waste heat of a heat source.

BACKGROUND ART

A Rankine cycle is publicly known, and is applied to waste heat recovery of an in-vehicle engine and the like from the viewpoint of energy saving, for example. The Rankine cycle system includes as a main configuration a closed circuit in which a pump, an evaporator, an expander, and a condenser are sequentially arranged, and a working fluid circulates. The pump pumps the working fluid toward the evaporator so as to circulate the working fluid in the closed circuit of the Rankine cycle system. In an example applied to the in-vehicle engine, the evaporator may be configured as a heat exchanger to heat and evaporate the working fluid with waste heat from the engine as a heat source, the expander may be configured to extract power from the working fluid that has passed through the evaporator, and the condenser may be configured as a heat exchanger to condense and liquefy the working fluid that has passed through the expander.

Patent Literature 1 discloses an example of a waste heat utilization device in a vehicle that includes such a Rankine cycle system. Patent Literature 1 discloses a configuration in which an expander is connected to a generator such that power is generated by a rotational driving force generated by the expander in the Rankine cycle system, and a configuration in which the rotational driving force generated by the expander is transmitted to an engine via a clutch and a pulley.

CITATION LIST

Patent Literature

Patent Literature 1: JP-A-2010-65587

SUMMARY OF INVENTION

Technical Problem

By the way, the power taken out by the expander is mechanical energy. Therefore, generally, a case where the power is transmitted from the expander to the engine (for example, an output shaft thereof) and used as it is tends to be superior in terms of energy efficiency to a case where the power is transmitted from the expander to the generator and used for power generation. On the other hand, in general, the power transmission from the expander to the engine cannot be performed when the vehicle is stopped or decelerated, whereas the power transmission from the expander to the generator can be performed regardless of a traveling state of the vehicle.

The technology of the present disclosure provides, in a waste heat utilization device in a vehicle, a waste heat utilization device that can more effectively utilize the power taken out by an expander of a Rankine cycle system thereof.

Solution to Problem

According to the technology of the present disclosure, there is provided a waste heat utilization device in a vehicle including: a Rankine cycle system sequentially provided with, in a circulation passage of a working fluid, a pump configured to pump the working fluid so as to circulate the working fluid in the circulation passage, an evaporator configured to heat and evaporate the working fluid pumped by the pump by waste heat of a heat source, an expander configured to expand the working fluid that has passed through the evaporator to generate power, and a condenser configured to condense the working fluid that has passed through the expander;

a motor generator connected to the expander and configured to be rotatable integrally with the expander;

a clutch device provided between the expander and a power transmission system of the vehicle; and a clutch control unit configured to control switching of the clutch device between a connected state and a disconnected state.

In the above-described waste heat utilization device, the motor generator may be disposed between the expander and the clutch device.

The above-described waste heat utilization device further includes a motor generator control unit configured to control an operation of the motor generator when the clutch device is in the connected state under the control of the clutch control unit, the motor generator control unit may be configured to control the operation of the motor generator so as to adjust the power transmitted to the power transmission system.

Advantageous Effects of Invention

According to the waste heat utilization device according to the technology of the present disclosure, since the above configuration is provided, the power can be taken out by the expander of the Rankine cycle system by utilizing the waste heat of the heat source, and while the power taken out is used in the motor generator, the power can be transmitted to the power transmission system of the vehicle by making the clutch device into a connected state and used as it is. Therefore, the power taken out by the expander can be used more effectively.

BRIEF DESCRIPTION OF DRAWINGS

FIG. 1 is a schematic configuration diagram of an engine and a power transmission system of a vehicle to which a waste heat utilization device according to an embodiment is applied.

FIG. 2 is a flowchart illustrating control of a clutch device in the waste heat utilization device of FIG. 1.

DESCRIPTION OF EMBODIMENTS

An embodiment of the present disclosure will be described below with reference to the accompanying drawings. The same components (or configurations) are denoted by the same reference numerals, and names and functions thereof are also the same. Therefore, detailed descriptions of the same components are not repeated.

FIG. 1 is a schematic configuration diagram of an internal combustion engine (hereinafter, referred to as "engine") and a power transmission system PS in a vehicle to which a waste heat utilization device 1 according to the present embodiment is applied. The waste heat utilization device 1 includes a Rankine cycle system 10. The Rankine cycle system 10 takes out power by using waste heat of a heat source, that is, generates power. Note that since the waste heat utilization device 1 can transmit the power taken out by the Rankine cycle system 10 to the power transmission system PS (configured to transmit power from the main power source (engine 22) to wheels) as described below, the waste heat utilization device 1 can be a power source. Therefore, the vehicle can be regarded as a hybrid vehicle including the waste heat utilization device 1 as a further power source in addition to the main power source.

The Rankine cycle system 10 includes a pump 12, an evaporator 14, an expander 16, and a condenser 18. The pump 12, the evaporator 14, the expander 16, and the condenser 18 are sequentially arranged in an annular passage 20 (which is a circulation passage) through which a working fluid flows, and these form a closed circuit. Here, ethanol is used as the working fluid, but the working fluid is not limited to ethanol, and another medium such as water may be used.

The pump 12 is configured to deliver, particularly pump, the working fluid to the evaporator 14 so as to circulate the working fluid in the annular passage 20. Here, the pump 12 is driven by a motor 12a. The pump 12 may be driven by another power (driving force), for example, power of the engine 22.

Also, the evaporator 14 is configured to heat and evaporate the working fluid by the waste heat of the heat source. The evaporator 14 is configured as a heat exchanger which causes heat exchange between the working fluid (in a liquid phase) pumped by the pump 12 and an exhaust gas flowing into an exhaust pipe 24 of the engine 22 (which is a heat source) so as to heat the working fluid. Here, the evaporator 14 is configured as a countercurrent heat exchanger. That is, in the evaporator 14, a flow direction of the exhaust gas of the engine 22 is generally opposite to a flow direction of the working fluid. The working fluid is heated by the heat (waste heat) of the exhaust gas to be thus vaporized (evaporated) in the evaporator 14, and the vaporized working fluid flows into the expander 16.

The expander 16 is configured to expand the working fluid that passes through the evaporator 14 to be thus vaporized so as to generate power. In the expander 16, the energy generated by the expansion of the working fluid is taken out as power (mechanical energy), in particular, as a rotational driving force, whereby an output shaft 16a, which is a rotating shaft member thereof, is rotated. Here, the expander 16 is configured as an axial piston type of rotating device (that generates the rotational driving force), and the output shaft 16a of the expander 16 is mechanically connected to a rotating shaft 26a of a motor generator (M/G) 26. Therefore, the expander 16 and the M/G 26 are integrally rotatable. Note that the M/G 26 includes both functions of an electric motor (motor) and a generator (generator), and mainly includes a rotor portion and a stator portion. The rotor portion is fixed to the rotating shaft 26a of the M/G 26 that is connected to the output shaft 16a of the expander 16 so as to be rotatable, and the stator portion is fixed to a housing. However, the expander 16 is not limited to being configured as the axial piston type of rotating device, and may include a configuration, for example, as a so-called turbine.

The condenser 18 is configured to condense the working fluid that passes through the expander 16 to be thus expanded. The condenser 18 is configured as a countercurrent heat exchanger. Then, cooling water (engine cooling water) of the engine 22 is used as a cooling source of the working fluid of the condenser 18. That is, in the condenser 18, a flow direction of the engine cooling water and a flow direction of the working fluid are generally opposite to each other. The condenser 18 conducts heat exchange between the working fluid (for example, in a vapor phase or in a gaseous state) that has passed through the expander 16 and engine cooling water as a cooling source so as to cool the working fluid. The working fluid is cooled by the heat exchange with the engine cooling water to be condensed (liquefied) in the condenser 18. Note that here, the engine cooling water flows into the condenser 18 after passing through the radiator 28, but the technique of the present disclosure is not limited to such a configuration, and the cooling water may be cooled by the radiator 28 after passing through the condenser 18 and returned to the engine 22. The working fluid condensed by passing through the condenser 18 is suctioned by the pump 12 and further delivered to the evaporator 14, and circulated again in the annular passage 20 (passed again through the evaporator 14, the expander 16, the condenser 18, and the pump 12 in this order).

In addition, in the Rankine cycle system 10, a tank 30 as a gas-liquid separator is provided between the condenser 18 and the pump 12. The tank 30 is provided so as to achieve gas-liquid separation of the working fluid. A working fluid flow path (upstream flow path portion) 32 that extends from a side of the condenser 18 toward the tank 30 is provided so as to communicate with an upper region in the tank 30. Also, a working fluid flow path (downstream flow path portion) 34 that extends from the tank 30 toward a side of the pump 12 is provided so as to communicate with a lower region in the tank 30. Here, since the lower region in the tank 30 is a region where the liquid-phase working fluid is accumulated, the lower region can be referred to as a liquid phase region. On the other hand, since the aforementioned upper region above the liquid phase region in the tank 30 in a vertical direction is a region where the gas-phase working fluid is accumulated, the upper region can be referred to as a gas phase region. That is, the upstream flow path portion 32 has an opening in the gas phase region in the tank 30, and the downstream side flow path portion 34 has an opening in the liquid phase region in the tank 30. Note that the gas-liquid separator is not limited to the tank 30, and may include, for example, a further configuration in addition to the tank 30.

Now, in the Rankine cycle system 10 of the above configuration, when the engine 22 is in an operating state, the working fluid is heated and evaporated by using the waste heat of the exhaust gas of the engine 22 in the evaporator 14, and the working fluid is expanded in the expander 16, which enables to generate power, particularly the rotational driving force. The rotational driving force generated by the expander 16 is transmitted to the rotating shaft 26a of the M/G 26 in a connected state via the output shaft 16a thereof, and can be used for power generation. Then, a clutch device 40 is connected to a tip of the rotating shaft 26a of the M/G 26. That is, the M/G 26 is disposed between the expander 16 and the clutch device 40. The clutch device 40 is an electromagnetic clutch, and is configured such that connection and disconnection thereof can be switched under the control of an electronic control unit (ECU) 60, which will be described below. Note that the switching of the clutch device 40 between the connection and disconnection may include bringing a so-called half-clutch (state).

A transmission 42 as a power transmission device is provided in the clutch device 40 on an opposite side of the M/G 26. The transmission 42 constitutes a part of the waste heat utilization device 1. The transmission 42 is configured to absorb a rotational speed difference between the output shaft 16a of the expander 16 and the power transmission system (for example, a power transmission shaft) PS of the vehicle. Note that here, the transmission 42 is configured as a single transmission device that performs rotational speed conversion by a single mechanism, but the transmission 42 may be configured as a multi-stage transmission device.

More specifically, the transmission 42 is configured to transmit the rotational driving force generated by the expander 16 to the power transmission shaft 44 (of the power transmission system PS) that is provided to transmit the power from the engine 22 to wheels that serve as drive wheels, or to transmit a rotational force (regenerative force) from the wheels to the M/G 26. Here, the power transmission shaft 44 is provided between the wheels on an output side of a transmission device (so-called transmission) 46 to which an output shaft (crankshaft) of the engine 22 is connected. Therefore, a rotation state of the power transmission shaft 44 corresponds to a rotation state of the wheels. Although not shown, the transmission 42 includes a first gear that is connected to the wheels or the power transmission shaft 44 and rotates in response to the rotation thereof, and a second gear that meshes directly or indirectly with the first gear and rotates at a rotational speed different from that of the first gear. Then, the second gear is mechanically connected to a second clutch engagement portion (which is different from a first clutch engagement portion to which the output shaft 16a of the expander 16 and the rotation shaft 26a of the M/G 26 are integrally and rotatably connected) in the clutch device 40. When the clutch device 40 is in the disconnected state, the first engagement portion and the second engagement portion are separated from each other, and when the clutch device 40 is in the connected state, the first engagement portion and the second engagement portion are in contact with each other so as to be able to transmit power. Specifically, the transmission 42 can be configured as a planetary gear mechanism.

By the way, in the vehicle to which the waste heat utilization device 1 having the above configuration is applied, various sensors are provided to detect a traveling state or an operating state thereof. For example, the annular passage 20 of the Rankine cycle system 10 is provided with a pressure sensor 62 for detecting the pressure of the working fluid and a temperature sensor 64 for detecting the temperature of the working fluid. Note that the pressure sensor 62 and the temperature sensor 64 are provided on a downstream side of the evaporator 14 and on an upstream side of the expander 16, respectively, but may be provided at other locations, for example, on a downstream side of the condenser 18 and an upstream side of the pump 12, respectively. Furthermore, an engine rotational speed sensor 66 for detecting a rotational speed of the engine, an air flow meter 68 for detecting an intake air amount to the engine 22, and an accelerator opening degree sensor 72 for detecting a step-down amount (accelerator opening degree) of an accelerator pedal (not shown) operated by a driver are provided. Also, a water temperature sensor 70 for detecting an engine cooling water temperature is provided. Also, a vehicle speed sensor 74 for detecting a vehicle speed is provided. Also, a brake switch 76 is provided that is turned on from an OFF state to an ON state when operated by the driver. Furthermore, a battery remaining amount sensor 78 for detecting a remaining amount of a battery (not shown) is provided. The battery may store the power generated by the M/G 26, and the electric power stored therein may be used for driving the motor 12a, starting the engine 22, and the like.

The outputs from these sensors are input to the above ECU 60. The ECU 60 is configured as a so-called computer so as to perform, for example, various controls of the Rankine cycle system 10, the engine 22, the M/G 26, and the clutch device 40, and includes a known arithmetic processing unit (for example, a CPU), a storage device (for example, a ROM or a RAM), an input port, an output port, and the like. The ECU 60 detects (acquires) various types of values based on the outputs from the sensors and performs a predetermined calculation based on programs and data stored in advance, and outputs an operation signal to each of the engine 22 (for example, an injector and a throttle valve), the motor 12a, the M/G 26, and the clutch device 40 for an operation control of the engine 22, a drive control of the motor 12a, a load control of the M/G 26, a connection/disconnection switching control of the clutch device 40, and the like. That is, the ECU 60 has respective functional units corresponding to: an engine control unit; a motor control unit; a motor generator control unit configured to control an operation (for example, load) of the M/G 26; and a clutch control unit configured to control the switching of the clutch device 40 between the connection and disconnection, and these control units are associated with each other. Note that the ECU 60 is not limited to one electronic control unit, and may be configured as a complex of a plurality of electronic control units.

The control of the clutch device 40 by the ECU 60 will be described with reference to FIG. 2. Note that the flow of FIG. 2 is executed at predetermined time intervals.

First, in step S201, the ECU 60 determines whether a predetermined clutch connection condition is satisfied or not based on the outputs of the sensors. Specifically, it is determined whether a determined engine operating state is a predetermined operating state or not based on the outputs of the engine rotational speed sensor 66 and engine load sensors (for example, the air flow meter 68 and the accelerator opening degree sensor 72). For example, the predetermined operating state may be defined as an operating state in which the engine rotational speed is equal to or higher than a predetermined rotational speed and an engine load is equal to or higher than a predetermined load. When the engine operating state is the predetermined operating state, engine warm-up is completed, the Rankine cycle system 10 is out of a starting state, the temperature of the working fluid passing through the evaporator 14 of the Rankine cycle system 10 is equal to or higher than the predetermined temperature, and the pressure of the working fluid is equal to or higher than a predetermined pressure. Therefore, the predetermined clutch connection condition may include at least one of the following: the temperature of the working fluid detected (acquired) based on the output of the temperature sensor 64 is equal to or higher than the predetermined temperature; the pressure of the working fluid detected (acquired) based on the output of the pressure sensor 62 is equal to or higher than the predetermined pressure; and the engine cooling water temperature detected (acquired) based on the output of the water temperature sensor 70 is equal to or higher than the predetermined temperature.

If a negative determination is made since the predetermined clutch connection condition is not satisfied in step S201, the process proceeds to step S203. In step S203, the ECU 60 outputs a signal to the clutch device 40 such that the clutch device 40 is in the disconnected state. However, the clutch device 40 is in the disconnected state in an initial state. The routine ends after passing through step S203, and the process proceeds to the next routine.

If an affirmative determination is made since the predetermined clutch connection condition is satisfied in step S201, the process proceeds to step S205. In step S205, it is determined whether the battery remaining amount detected (acquired) based on the output of the battery remaining amount sensor 78 is equal to or greater than a predetermined amount or not. This determination is made to avoid a shortage of the battery remaining amount (shortage of electric power).

If an affirmative determination is made since the battery remaining amount is equal to or greater than the predetermined amount in step S205, the process proceeds to step S207. In step S207, the ECU 60 outputs a signal to the clutch device 40 so that the clutch device 40 is in the connected state. However, if a negative determination is made since the battery remaining amount is not equal to or greater than the predetermined amount in step S205, the process proceeds to step S203 described above, and the clutch device 40 is brought into the disconnected state. Then, the routine ends after passing through step S207, and the process proceeds to the next routine and is repeated from step S201 again.

In this way, the connection and disconnection of the clutch device 40 is switched. Next, the control of the M/G 26 according to the state of the clutch device 40 and so on will be described. First, a case where the clutch device 40 is in the disconnected state will be described.

When the clutch device 40 is in the disconnected state, the expander 16 is rotatable integrally with the M/G 26, but is separated from the power transmission system PS of the vehicle. Therefore, as long as the Rankine cycle system 10 operates as described above by using the waste heat of the engine 22, power generation is performed using the M/G 26 as a generator by the rotational driving force generated in the expander 16. The power generation state of the M/G 26 is adjusted in such a manner that the ECU 60 controls the operation of the M/G 26 (specifically, the load) in accordance with the acquired battery remaining amount. In addition, the control of the M/G 26 by the ECU 60 is executed so as to maintain the rotational speed of the output shaft 16a of the expander 16 within a predetermined rotational speed range. This is for stable operation of the expander 16. However, this control may be performed in combination with the control of the motor 12a of the pump 12 by the ECU 60. Preferably, the ECU 60 executes the control of the M/G 26 and the control of the motor 12a in accordance with data and the like determined in advance based on experiments so as to increase an operation efficiency of the Rankine cycle system 10.

Further, when the Rankine cycle system 10 is in the starting state as when the engine is started and the expander 16 starts rotating, the ECU 60 outputs a signal so as to operate the M/G 26 as a motor. In this way, a start assist of the expander 16 can be performed. Note that a control amount of the M/G 26 at this time is related to a control amount of the motor 12a. In particular, in the present embodiment, since the expander 16 is the axial piston type of rotating device described above and is originally unstable in the operation at the beginning of rotation as compared with a case where the expander 16 is configured as a turbine, the above assist is effective.

On the other hand, when the clutch device 40 is in the connected state, the expander 16 is connected to the transmission 42 (via the M/G 26 in the connected state). At this time, the ECU 60 (that is, the motor generator control unit) controls the operation (for example, load) of the M/G 26 so as to adjust the power to be transmitted to the power transmission system PS via the transmission 42. For this power adjustment, the ECU 60 calculates the control amount of the M/G 26 based on the engine operating state determined as described above. In particular, when the engine 22 is in the operating state (for example, an acceleration state) in which the acquired accelerator opening degree is equal to or greater than a predetermined opening degree, the clutch device 40 is brought into the connected state, and the power generated by the expander 16 may be transmitted to the power transmission system PS so as to supplement the power from the engine 22. Specifically, the ECU 60 can control the operation of the M/G 26 such that the amount of power transmission from the expander 16 to the power transmission system PS increases as the acquired accelerator opening degree increases (as the step-down amount of the accelerator pedal increases). In particular, in a case where (the motor generator control unit of) the ECU 60 controls the M/G 26 to bring the load of the M/G 26 to zero, the power generated by the expander 16 can be transmitted to the power transmission system PS of the vehicle almost without change. In this way, the power transmission from the engine 22 to the wheels can be more effectively assisted, and thus reduction of fuel consumption of the engine and the like can be expected. When the power generated by the expander 16 is transmitted to the power transmission system PS of the vehicle, the M/G 26 can be further operated as a motor. The operation amount of the motor may be obtained by a calculation (based on predetermined data and the like) that is performed based on the accelerator opening degree detected (acquired) based on the output of the accelerator opening degree sensor. Of course, at this time, the battery remaining amount may be considered. Furthermore, in a case where the M/G 26 is operated as a motor, the amount of power transmission from the waste heat utilization device 1 to the power transmission system PS of the vehicle can be further increased, and thus an assist effect can be enhanced.

As described above, according to the waste heat utilization device 1 of the present embodiment, when the clutch device 40 is in the disconnected state, the Rankine cycle system 10 can be suitably operated, and the power generated by the expander 16 can be used to continue power generation. In this way, the battery remaining amount can be maintained at a predetermined amount or more, and a power state of the vehicle can be improved. On the other hand, when the clutch device 40 is in the connected state since the predetermined clutch connection condition is satisfied, the rotational driving force from the expander 16 or from both of the expander 16 and the M/G 26 can be supplementarily transmitted to the power transmission system PS (in short, to the wheels) in addition to the power of the engine 22. In this way, for example, it is possible to suppress fuel consumption of the engine which is the main driving source of the vehicle. As described above, according to the waste heat utilization device 1 of the present embodiment, it is possible to more effectively use the power extracted by the expander 16 of the Rankine cycle system 10.

Furthermore, when the accelerator opening degree detected (acquired) based on the output of the accelerator opening degree sensor 72 is zero (that is, when the accelerator pedal (not shown) is not stepped down) and when the brake switch 76 is ON (that is, when the brake pedal is stepped down) in a state where the clutch device 40 is in the connected state, the M/G 26 can be operated as a generator in such a way that the ECU 60 controls the M/G 26. In this way, it is possible to further increase the energy efficiency of the waste heat utilization device 1.

On the other hand, when the clutch device 40 in the disconnected state is brought into the connected state (under the control of the ECU 60 (that is, the clutch control unit)), the ECU 60 (that is, the motor generator control unit) controls the load of the M/G 26 such that the difference between the rotational speed of the output shaft 16a of the expander 16 (that is, the rotating shaft 26a of the M/G 26) and the rotational speed of the rotating shaft 42a serving as the rotating body of the transmission 42 falls within a predetermined range. In this way, for example, it is possible to avoid an unnecessary impact to be caused on the vehicle due to a connecting work of the clutch device 40. Note that the rotating shaft 42a of the transmission 42 is mechanically connected to the aforementioned second gear.

Incidentally, the present disclosure is not limited to the above-described embodiment, and can be appropriately modified and implemented without departing from the scope of the present disclosure.

In the Rankine cycle system described above, the engine cooling water is used for cooling the working fluid in the condenser, but the present disclosure is not limited thereto, and the condenser may be configured to cool the working fluid with outside air. Alternatively, depending on the type of working fluid, the engine cooling water may exchange heat with the working fluid in the evaporator 14. Further, instead of the engine 22, a fuel cell system may be used as the power source or the heat source. In this case, heat (waste heat) from, for instance, water vapor discharged from a fuel cell of the fuel cell system may be used for heat exchange in the evaporator 14.

Furthermore, in the above embodiment, the M/G 26 is disposed between the expander 16 and the clutch device 40, and the clutch device 40 is provided between the expander 16 and the power transmission system PS of the vehicle. Then, by control of the M/G 26 and the clutch device 40, the output of the expander 16, that is, the generated power can be substantially directly transmitted to the power transmission system PS. The technology of the present disclosure allows various modes in which a clutch device is provided between the expander 16 and the power transmission system PS of the vehicle. That is, the arrangement of the M/G 26, the expander 16 and the clutch device 40 is not limited to the arrangement in the above embodiment. For example, an arrangement such that the expander 16 is located between the M/G 26 and the clutch device 40 is also possible.

The present application is based on Japanese Patent Application (No. 2018-028315) filed on Feb. 20, 2018, contents of which are incorporated herein as reference.

INDUSTRIAL APPLICABILITY

Accordingly to a waste heat utilization device of the present disclosure, in the waste heat utilization device in a vehicle, power taken out by an expander of a Rankine cycle system thereof can be more effectively utilized.

REFERENCE SIGNS LIST 1 waste heat utilization device
10 Rankine cycle system
12 pump
12a motor
14 evaporator
16 expander
18 condenser
20 annular passage (circulation passage)
22 engine
26 motor generator
40 clutch device
42 transmission
60 electronic control unit (ECU)
PS power transmission system

The invention claimed is:
1. A waste heat utilization device in a vehicle comprising:
a Rankine cycle system sequentially provided with, in a circulation passage of a working fluid, a pump configured to pump the working fluid so as to circulate the working fluid in the circulation passage, an evaporator configured to heat and evaporate the working fluid pumped by the pump by waste heat of a heat source, an expander configured to expand the working fluid that has passed through the evaporator to generate power, and a condenser configured to condense the working fluid that has passed through the expander;
a motor generator connected to the expander and configured to be rotatable integrally with the expander;
a clutch device provided between the expander and a power transmission system of the vehicle; and
a clutch control unit configured to control switching of the clutch device between a connected state and a disconnected state,
and bring the clutch device into the connected state when an accelerator opening degree which is a step-down amount of an accelerator pedal is equal to or greater than a predetermined opening degree; and
a motor generator control unit configured to control a load of the motor generator such that an amount of power transmission from the expander to the power transmission system increases as the accelerator opening degree increases, in a case where the clutch device is in the connected state.
2. The waste heat utilization device according to claim 1, wherein the motor generator is disposed between the expander and the clutch device.
3. The waste heat utilization device according to claim 1, wherein the clutch control unit is configured to determine whether an engine operating state is a predetermined operating state or not based on outputs from an engine rotational speed sensor and an engine load sensor,
wherein when it is determined that the engine operating state is not the predetermined operating state, the clutch control unit is configured to control the clutch device to be in the disconnected state,
wherein when it is determined that the engine operating state is the predetermined operating state, the clutch control unit is configured to determine whether a remaining battery capacity is equal to or greater than a predetermined amount or not based on an output of a battery remaining amount sensor,
wherein when it is determined that the battery remaining amount is equal to or greater than the predetermined amount, the clutch control unit is configured to control the clutch device to be in the connected state, and
wherein when it is determined that the battery remaining amount is not equal to or greater than the predeter- mined amount, the clutch control unit is configured to control the clutch device to be in the disconnected-state.

\* \* \* \* \*